United States Patent
Murakami (10) Patent No.: US 8,653,705 B2
(45) Date of Patent: Feb. 18, 2014

(54) STATOR COOLING DEVICE

(75) Inventor: Satoshi Murakami, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 277 days.

(21) Appl. No.: 13/282,925

(22) Filed: Oct. 27, 2011

(65) Prior Publication Data

US 2012/0126641 A1 May 24, 2012

(30) Foreign Application Priority Data

Nov. 22, 2010 (JP) ................................. 2010-260412

(51) Int. Cl.
*H02K 9/00* (2006.01)

(52) U.S. Cl.
USPC .................................. 310/54; 310/52; 310/59

(58) Field of Classification Search
USPC ..................................... 310/52–54, 58–59, 89
See application file for complete search history.

(56) References Cited

U.S. PATENT DOCUMENTS

| | | | | |
|---|---|---|---|---|
| 4,262,224 A | * | 4/1981 | Kofink et al. | 310/54 |
| 4,293,788 A | * | 10/1981 | Binder | 310/227 |
| 4,739,204 A | * | 4/1988 | Kitamura et al. | 310/68 D |
| 4,818,906 A | | 4/1989 | Kitamura et al. | |
| 5,939,806 A | * | 8/1999 | Kim et al. | 310/60 A |
| 6,787,949 B2 | * | 9/2004 | Bostwick et al. | 310/59 |
| 7,042,121 B2 | * | 5/2006 | De Filippis et al. | 310/63 |
| 7,538,457 B2 | * | 5/2009 | Holmes et al. | 310/54 |
| 7,576,458 B2 | * | 8/2009 | Wehner et al. | 310/54 |
| 8,067,865 B2 | * | 11/2011 | Savant | 310/52 |

FOREIGN PATENT DOCUMENTS

| | | |
|---|---|---|
| JP | A-62-260544 | 11/1987 |
| JP | A-2008-178243 | 7/2008 |
| JP | A-2009-017700 | 1/2009 |

OTHER PUBLICATIONS

Feb. 14, 2012 International Search Report issued in PCT/JP2011/005237 (with translation).

* cited by examiner

*Primary Examiner* — Thanh Lam
(74) *Attorney, Agent, or Firm* — Oliff PLC (57) ABSTRACT

A stator cooling device configured with a cylindrical stator main body that uses a rotation axis of a rotary electric machine as a central axis. A fixed portion is formed on an outer peripheral portion of the stator main body so as to protrude outward in a radial direction of the stator main body. A cooling medium flow passage includes an injection hole through which cooling medium is injected. The fixed portion is configured above a horizontal plane that passes through the central axis, and a peak portion that is farthest in the fixed portion from the central axis as viewed in an axial direction of the central axis. The injection hole opens toward the fixed portion above the outer peripheral portion of the stator and toward the first vertical plane side with respect to a second vertical plane that is a vertical plane that passes through the peak portion.

16 Claims, 8 Drawing Sheets

STATOR COOLING DEVICE

INCORPORATION BY REFERENCE

The disclosure of Japanese Patent Application No. 2010-260412 filed on Nov. 22, 2010 including the specification, drawings and abstract is incorporated herein by reference in its entirety.

BACKGROUND OF THE INVENTION

The present invention relates to a stator cooling device, and specifically, relates to a stator cooling device provided with a cooling medium flow passage.

DESCRIPTION OF THE RELATED ART

A stator cooling device is known for cooling a stator core of a rotary electric machine that functions as at least one of a motor and a generator. The stator cooling device may include a cooling medium flow passage. A cooling medium is supplied to the stator core through a downward hole that opens vertically downward in the cooling medium flow passage such that the cooling medium falls by the force of gravity to flow downward along an outer peripheral portion of the stator core. In this manner, heat exchange is performed (see Japanese Patent Application Publication No. JP-A-2008-178243).

The stator core described above includes a cylindrical stator main body that uses a rotation axis of the rotary electric machine as a central axis, and a fixed portion that fixes the stator main body to a housing case that is a case that houses the rotary electric machine. The fixed portion is disposed at least one location on an outer peripheral portion of the stator main body above a horizontal plane that passes through the central axis of the stator main body, so as to firmly fix the stator main body to the housing case. Further, the fixed portion is formed to protrude from the outer peripheral portion of the stator main body outward in a radial direction of the stator main body.

SUMMARY OF THE INVENTION

However, if the stator core includes the fixed portion as in the related art described above, the following problem may occur when the related art is applied to supply the cooling medium to the stator core through the downward hole in the cooling medium flow passage such that the cooling medium falls by the force of gravity to flow downward along the outer peripheral portion of the stator core. Specifically, in the art described above, when the cooling medium flows downward, the flow of the cooling medium may be blocked by the fixed portion. Thus, the cooling medium does not flow downward to reach the outer peripheral portion that is lower than the fixed portion, and it may not be possible to cool that particular portion. Consequently, the stator main body may be cooled in an uneven manner.

It is an object of the present invention to provide art that suppresses uneven cooling of the stator main body provided with the fixed portion.

The present invention was devised in order to at least partially solve the problem described above, and may be embodied as modes or aspects that will be described below.

[First Aspect]

A stator cooling device includes a cylindrical stator main body that uses a rotation axis of a rotary electric machine as a central axis, a fixed portion that is formed on an outer peripheral portion of the stator main body so as to protrude outward in a radial direction of the stator main body, and fixes the stator main body to a case that houses the rotary electric machine, and a cooling medium flow passage into which a cooling medium is supplied and that includes an injection hole through which the cooling medium is injected. In the stator cooling device, the fixed portion is disposed above a horizontal plane that passes through the central axis, and a peak portion that is farthest in the fixed portion from the central axis as viewed in an axial direction of the central axis is disposed at a position displaced from a first vertical plane that is a vertical plane that passes through the central axis. The injection hole opens toward the fixed portion above the outer peripheral portion of the stator main body and toward the first vertical plane side with respect to a second vertical plane that is a vertical plane that passes through the peak portion.

According to the stator cooling device of the first aspect, the fixed portion is disposed above the horizontal plane that passes through the central axis of the stator main body, and the peak portion is disposed at a position displaced from the first vertical plane as viewed in the axial direction. With this configuration, it is possible to reduce a height of the stator cooling device in a vertical direction, and also possible to make the stator cooling device more compact. In addition, according to the stator cooling device as configured above, the injection hole in the cooling medium flow passage is formed to open toward the fixed portion. With this configuration, the cooling medium injected through the injection hole can directly impact and pass over the fixed portion, and flow downward toward the outer peripheral portion that is lower than the fixed portion in the stator main body, whereby it is possible to cool the outer peripheral portion that is lower than the fixed portion. Consequently, uneven cooling of the stator main body can be suppressed. Furthermore, according to the stator cooling device as configured above, the injection hole in the cooling medium flow passage is disposed above the outer peripheral portion of the stator main body and on the first vertical plane side with respect to the second vertical plane that passes through the peak portion of the fixed portion. Accordingly, the cooling medium can be injected such that the cooling medium directly impacts the fixed portion and passes over the fixed portion.

[Second Aspect]

In the stator cooling device according to the first aspect, the cooling medium may be injected through the injection hole such that an angle, which is an inferior angle, is obtusely formed between a line segment, which is a line segment that is on a tangent line passing through an impact position at which the cooling medium injected through the injection hole impacts the fixed portion, and that extends from the impact position toward the peak portion side, and another line segment, which passes through the impact position and the injection hole.

According to the stator cooling device of the second aspect, the cooling medium is injected through the injection hole such that the angle, which is an inferior angle, is obtusely formed between the line segment, which is a line segment that is on the tangent line passing through the impact position at which the cooling medium impacts the fixed portion, and that extends from the impact position toward the peak portion side, and another line segment, which passes through the impact position and the injection hole. With this configuration, the cooling medium injected through the injection hole can easily pass over the fixed portion and flow downward toward the outer peripheral portion that is lower than the fixed portion in the stator main body, thereby promoting the cooling of the outer peripheral portion that is lower than the fixed portion.

[Third Aspect]

In the stator cooling device according to the first aspect or the second aspect, at least part of the injection hole may be disposed inward of a circle that is formed about the central axis and passes through the peak portion as viewed in the axial direction.

According to the stator cooling device of the third aspect, at least part of the injection hole is disposed inward of the circle that is formed about the axis and passes through the peak portion as viewed in the axial direction. With this configuration, the cooling medium flow passage and the stator main body are disposed close to each other, and this makes it possible to achieve a more compact stator cooling device.

[Fourth Aspect]

In the stator cooling device according to any one of the first to third aspects, if the injection hole is referred to as a first injection hole, the cooling medium flow passage may include a second injection hole that is different from the first injection hole, and through which the cooling medium is injected toward a second outer peripheral portion, wherein a first outer peripheral portion and the second outer peripheral portion are formed by dividing the outer peripheral portion of the stator main body above the horizontal plane that passes through the central axis by the first vertical plane that passes through the central axis such that the fixed portion is disposed in the first outer peripheral portion, and the second outer peripheral portion is opposite the first outer peripheral portion.

According to the stator cooling device of the fourth aspect, the cooling medium flow passage includes the second injection hole through which the cooling medium is injected toward the second outer peripheral portion that is opposite the first outer peripheral portion where the fixed portion is disposed, with the first outer peripheral portion and the second outer peripheral portion formed by dividing the outer peripheral portion above the horizontal plane that passes through the central axis by the first vertical plane that passes through the central axis. With this configuration, the cooling medium can be injected to the second outer peripheral portion in addition to the first outer peripheral portion, whereby it is possible to cool the second outer peripheral portion. Moreover, the cooling medium injected to the second outer peripheral portion flows downward toward and thus can cool the outer peripheral portion that is lower than the second outer peripheral portion. Consequently, in the stator main body, it is possible to cool the outer peripheral portion that includes the second outer peripheral portion among the outer peripheral portion divided by the first vertical plane. Accordingly, uneven cooling of the stator main body can further be suppressed.

[Fifth Aspect]

In the stator cooling device according to the fourth aspect, the first injection hole and the second injection hole may be disposed at a same position in the axial direction.

With respect to the stator cooling device of the fifth aspect, the first injection hole and the second injection hole are disposed at the same position in the axial direction. With this configuration, in the stator main body, the cooling medium is injected from the same position in the axial direction toward each of the first outer peripheral portion and the second outer peripheral portion. Accordingly, uneven cooling between the first outer peripheral portion side and the second outer peripheral portion side in the axial direction can be suppressed. Specifically, it is possible to suppress uneven cooling between positions on the first outer peripheral portion side and the second outer peripheral portion side that are symmetrical in the axial direction with respect to the first vertical plane.

[Sixth Aspect]

In the stator cooling device according to the fourth aspect or the fifth aspect, the first injection hole may have a smaller diameter than the second injection hole.

According to the stator cooling device of the sixth aspect, the first injection hole has a smaller diameter than the second injection hole. With this configuration, the cooling medium can be more strongly injected through the first injection hole compared to the second injection hole. Accordingly, the cooling medium injected through the first injection hole can easily pass over the fixed portion, and therefore, a large amount of cooling medium can flow downward toward the outer peripheral portion that is lower than the fixed portion. Consequently, it is possible to suppress uneven cooling of the outer peripheral portion that is lower than the fixed portion.

It should be noted that the present invention may be embodied in forms representing various devices, such as a rotary electric machine unit, a rotary electric machine, a cooling medium flow passage, a stator, and a vehicle provided with a stator cooling device, for example. In addition, the present invention may be embodied in forms representing various methods, such as a cooling method for cooling a stator.

DETAILED DESCRIPTION OF THE EMBODIMENTS

A. First Embodiment

A1. Configuration of Rotary Electric Machine Unit

Figure 1:
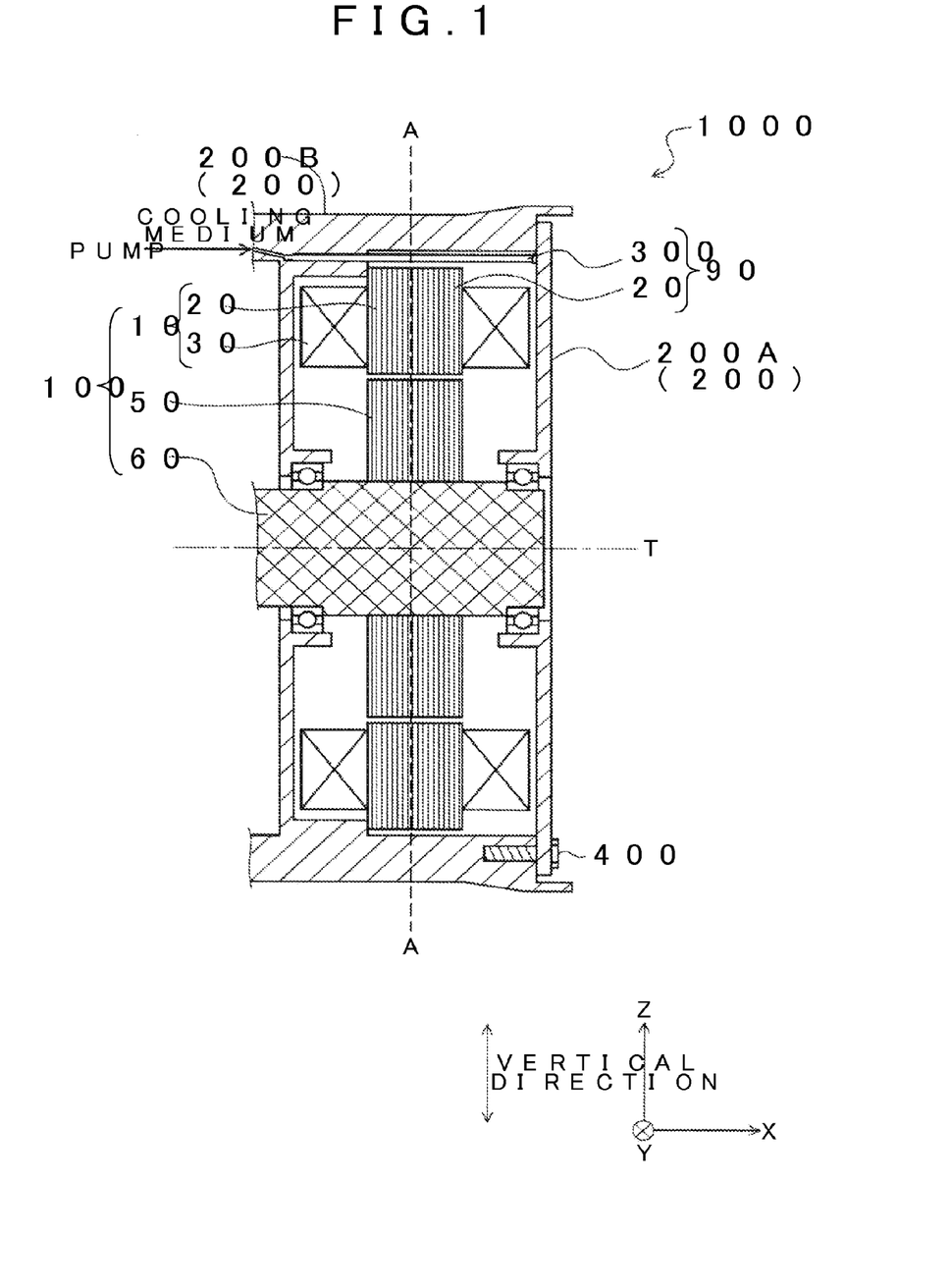
FIG. 1 is a view showing a cross section of a rotary electric machine unit 1000 serving as an embodiment of the present invention.
Figure 2:
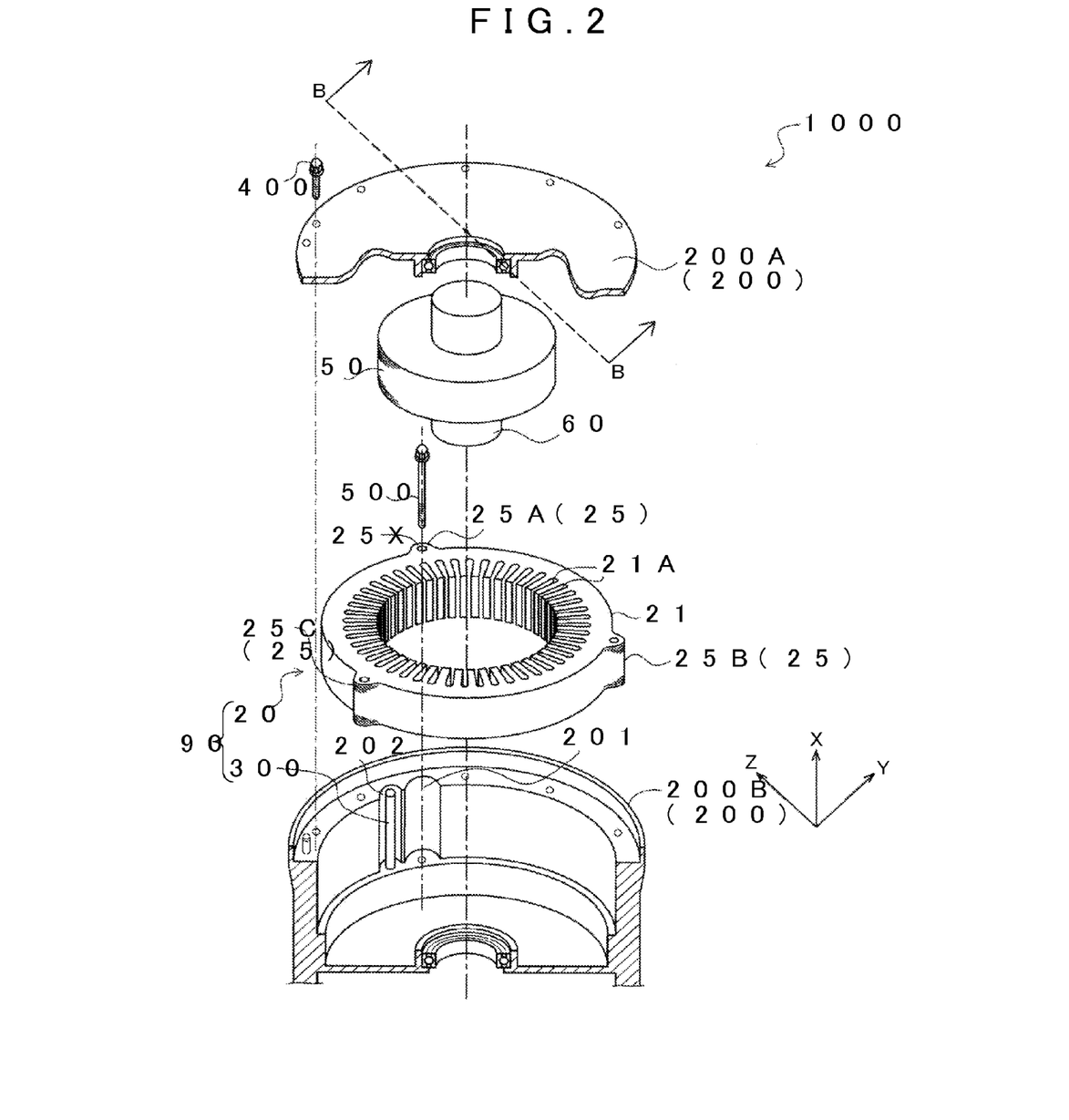
FIG. 2 is an exploded perspective view of the rotary electric machine unit 1000.
Figure 3:
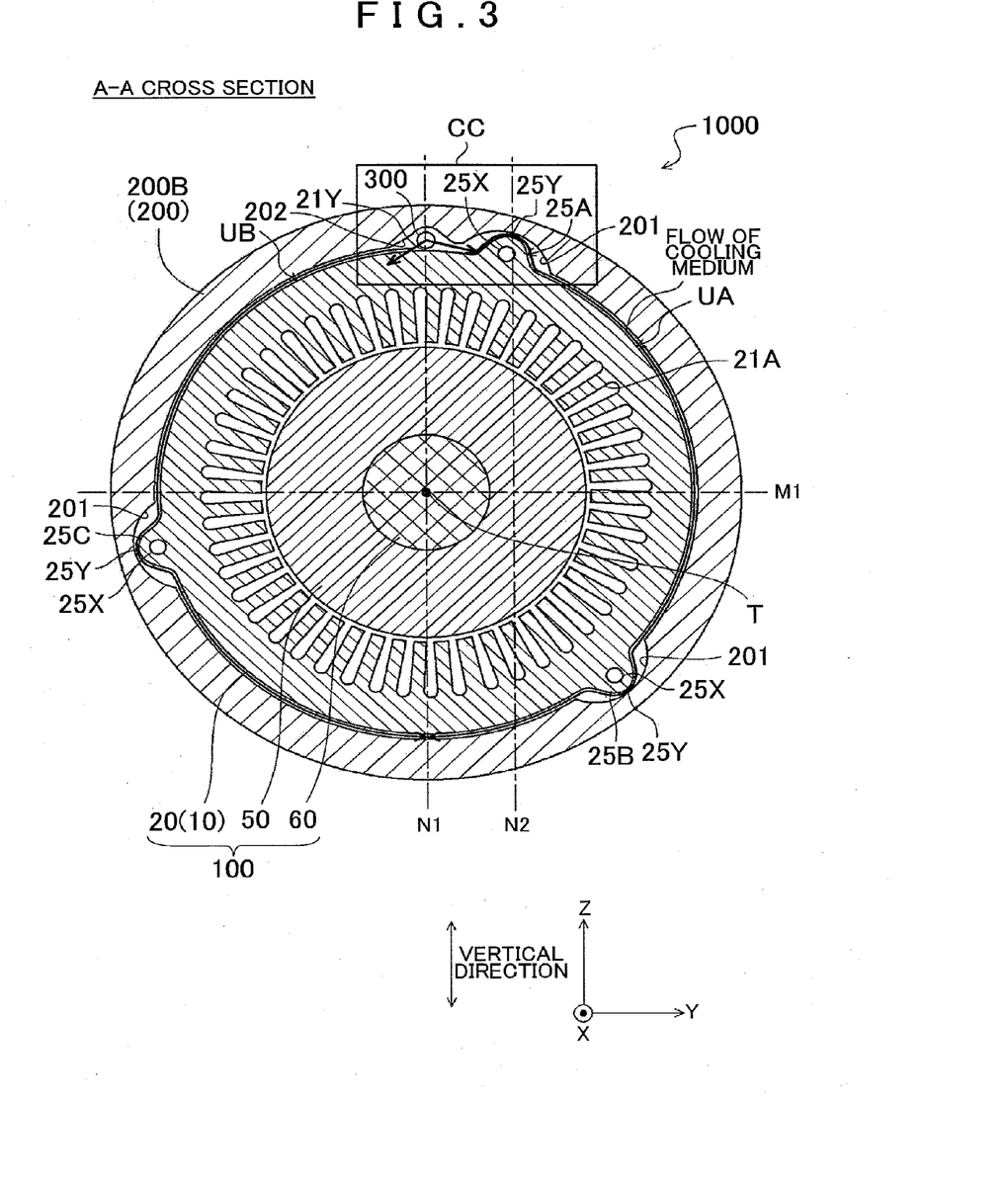
FIG. 3 is a cross-sectional view taken along a line A-A in FIG. 1.

FIG. 1 is a view showing a cross section of a rotary electric machine unit 1000 serving as a first embodiment of the present invention. In FIG. 1, an up-down direction serves as a vertical direction, and a left-right direction serves as a horizontal direction. In addition, an x direction, a y direction, and a z direction are defined as illustrated in FIG. 1. The z direction is an upward direction along the vertical direction, and the x direction and the y direction are directions along the horizontal direction. The x direction is orthogonal to the y direction. The x direction is a rightward direction in FIG. 1, and the y direction is a direction extending along a direction heading into the paper in FIG. 1. FIG. 2 is an exploded perspective view showing the rotary electric machine unit 1000. FIG. 1 corresponds to a view of a cross section taken along a line B-B in FIG. 2 as viewed from the y direction. FIG. 3 is a cross-sectional view taken along a line A-A in FIG. 1. Specifically, FIG. 3 is a view of a cross section taken along the line A-A in FIG. 1 as viewed from the x direction.

As shown in FIGS. 1 to 3, the rotary electric machine unit 1000 includes a rotary electric machine 100, a housing case 200, a cooling medium flow passage 300, and screws 400, 500. The cooling medium flow passage 300 will be described in detail later.

The rotary electric machine 100 includes a stator 10, a rotor 50, and a shaft 60, as shown in FIGS. 1 to 3. In this embodiment, the rotary electric machine unit 1000 (rotary electric machine 100) is disposed such that the shaft 60 is parallel to the x direction (horizontal direction). The rotary electric machine 100 functions as a motor and a generator. The rotor 50 is cylindrically formed, and a magnet is disposed inside the rotor 50. The rotor 50 is fixed to the shaft 60.

The stator 10 includes a stator core 20 and a coil 30 as shown in FIGS. 1 to 3. The stator core 20 is formed by laminating a plurality of stator laminated plates (not shown), each of which is a ring-shaped steel plate. The stator core 20 thus formed includes a stator main body 21 that is cylindrically formed, and a fixed portion group 25. The stator main body 21 includes a plurality of slot portions 21A disposed on an inner peripheral portion of the stator main body 21 at the same pitch. The coil 30 is wound in the slot portions 21A. A central axis of the stator core 20 (stator main body 21) coincides with a rotation axis of the rotary electric machine 100 (shaft 60). Hereinafter, the central axis will also be referred to as a central axis T. In addition, a direction along the central axis T will also be referred to as an axial direction. The axial direction coincides with the horizontal direction. Further, a direction extending from the stator main body 21 toward the central axis T will also be referred to as a radially inward direction, and a direction extending away from the central axis T and opposite the radially inward direction will also be referred to as a radially outward direction.

The fixed portion group 25 is formed of three fixed portions, that is, a first fixed portion 25A, a second fixed portion 25B, and a third fixed portion 25C, as shown in FIGS. 2 and 3. These three fixed portions are each formed on an outer peripheral portion of the stator main body 21 to protrude therefrom in the radially outward direction. Specifically, the three fixed portions are each formed into a substantially semi-cylindrical shape of the same size, and a semi-circular surface of each of the fixed portions faces toward the radially outward direction. That is, in this case, the three fixed portions are each formed on the outer peripheral portion of the stator main body 21 so as to protrude therefrom in a direction opposite the direction extending toward the central axis T as viewed in the axial direction (X direction). The first fixed portion 25A corresponds to a fixed portion according to the claims.

The three fixed portions each include a through hole 25X that penetrates through the fixed portion in the axial direction, and a peak portion 25Y that is a portion farthest of the fixed portion from the central axis T as viewed in the axial direction. The three fixed portions are disposed in the stator core 20 such that a triangle formed by connecting the peak portions 25Y of the three fixed portions is an equilateral triangle. In other words, the three fixed portions are disposed on the outer peripheral portion of the stator core 20 such that an interval between two adjacent fixed portions as viewed in the axial direction is equal. The first fixed portion 25A is disposed at a position above a horizontal plane (hereinafter also referred to as a horizontal plane M1) that passes through the central axis T, and the peak portion 25Y of the first fixed portion 25A is disposed at a position displaced from a vertical plane (hereinafter also referred to as a first vertical plane N1) that passes through the central axis T. The second fixed portion 25B and the third fixed portion 25C are disposed at positions below the horizontal plane M1.

The housing case 200 includes a case lid portion 200A and a case body portion 200B, as shown in FIGS. 1 to 3. The rotary electric machine 100 is housed inside the housing case 200. The case body portion 200B includes three recessed portions 201 in which the three fixed portions of the fixed portion group 25 are respectively disposed, and a recessed portion 202 in which the cooling medium flow passage 300 is disposed. As shown in FIG. 3, a predetermined clearance is provided between each recessed portion 201 and corresponding fixed portion. Further, as shown in FIG. 3, a predetermined clearance is also provided between the case body portion 200B and the stator main body 21. These clearances are capable of functioning as flow passages (described later) through which a cooling medium flows. The screw 400 fixes the case lid portion 200A to the case body portion 200B. The screw 500 is inserted into each through hole 25X (described later) that is axially formed in the fixed portion group 25 of the stator core 20, and fixes the stator core 20 to the case body portion 200B.

Note that, the stator core 20 (in particular, the stator main body 21 and the first fixed portion 25A overall) and the cooling medium flow passage 300 overall correspond to a stator cooling device according to the claims. Hereinafter, the stator core 20 and the cooling medium flow passage 300 will also be referred to overall as a stator cooling device 90.

A2. Configuration of Cooling Medium Flow Passage 300

Figure 4:
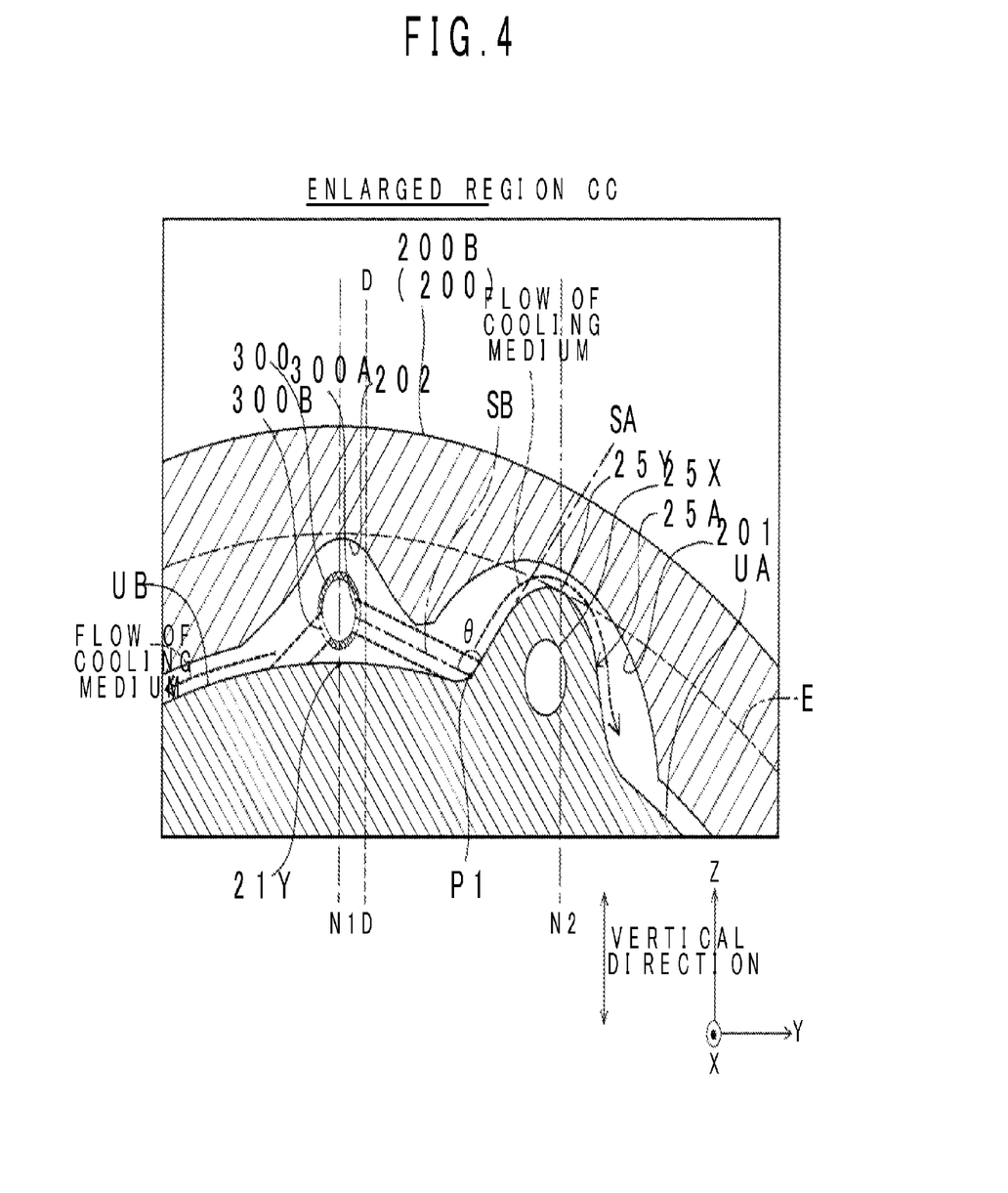
FIG. 4 is an enlarged view of a region CC in FIG. 3.
Figure 5:
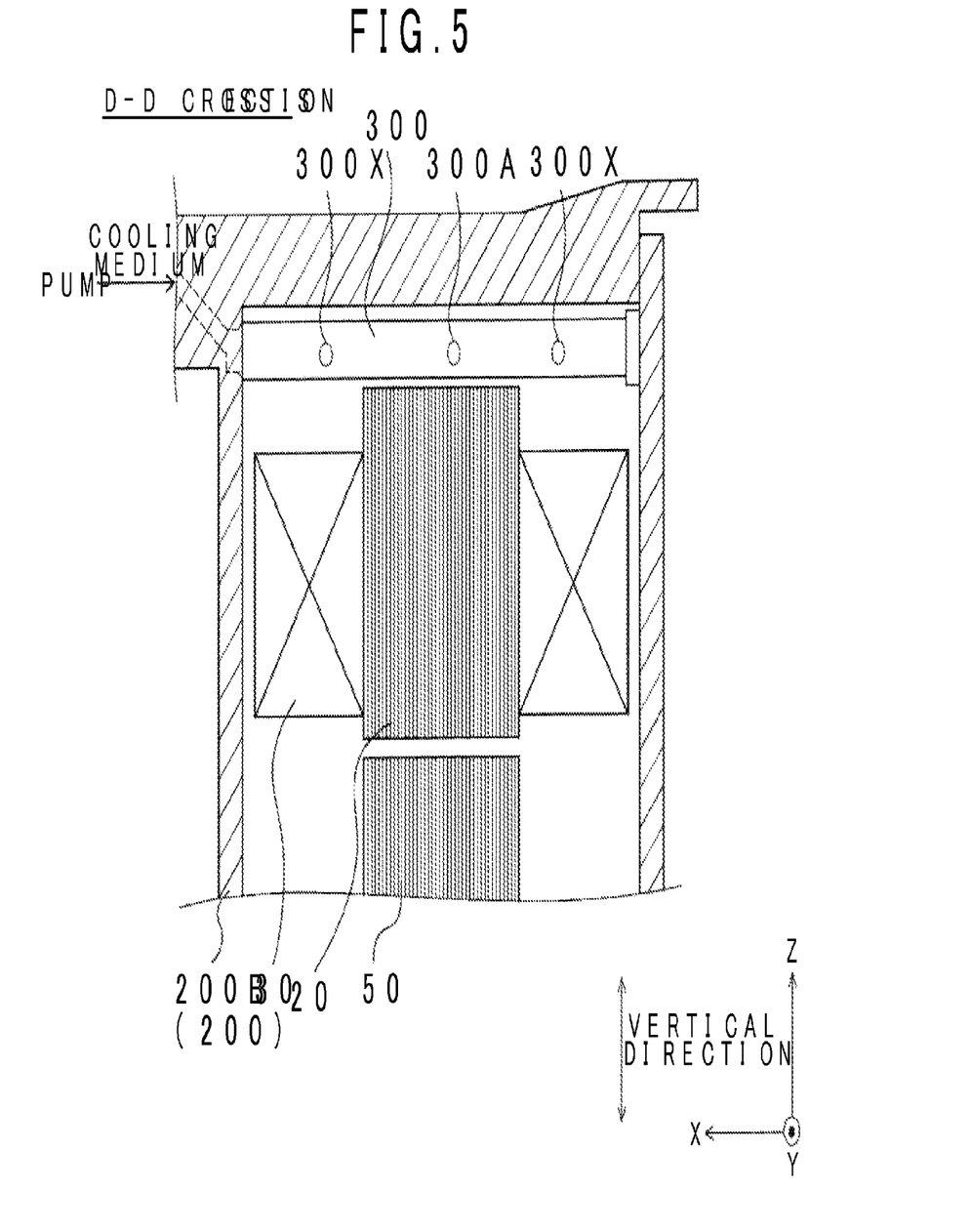
FIG. 5 is a cross-sectional view taken along a line D-D in FIG. 4.

FIG. 4 is an enlarged view showing a region CC in FIG. 3. FIG. 5 is a view showing a cross section taken along a line D-D in FIG. 4. The cooling medium flow passage 300 is a flow passage to which the cooling medium (for example, cooling oil or the like) for cooling the stator core 20 is supplied from a pump (not shown) disposed external to the rotary electric machine unit 1000.

The cooling medium flow passage 300 is disposed in the recessed portion 202 formed in the case body portion 200B so as to be parallel to the central axis T, as shown in FIGS. 2 to 4. In addition, the cooling medium flow passage 300 is disposed above the outer peripheral portion of the stator main body 21 and on the first vertical plane N1 side with respect to a vertical plane (hereinafter also referred to as a second vertical plane N2) that passes through the peak portion 25Y of the first fixed portion 25A. Specifically, as shown in FIG. 4, the cooling medium flow passage 300 is disposed on the first vertical plane N1, above an uppermost portion 21Y that is the highest region of the stator main body 21, and inward of a circle E that is formed about the central axis T and passes through the peak portion 25Y of the first fixed portion 25A as viewed in the axial direction. As shown in FIG. 5, the flow of the cooling medium is blocked at an end portion of the cooling medium flow passage 300 opposite the pump side.

As shown in FIGS. 4 and 5, the cooling medium flow passage 300 includes a first injection hole 300A and a second injection hole 300B. The first injection hole 300A corresponds to an injection hole that opens toward the fixed portion according to the claims.

As shown in FIG. 4, the first injection hole 300A is a hole through which the cooling medium is injected, and opens in the cooling medium flow passage 300 toward the first fixed portion 25A. The pump supplies the cooling medium to the cooling medium flow passage 300 at a sufficiently high pressure. Therefore, the first injection hole 300A is formed such that at least part of the injected cooling medium directly impacts the first fixed portion 25A. Specifically, as shown in FIG. 4, the first injection hole 300A is formed so as to inject the cooling medium such that an angle θ, which is an inferior angle, is obtusely formed between a line segment SA and a line segment SB. In this case, the line segment SA is a line segment that is on a tangent line passing through an impact position P1 at which the cooling medium injected through the first injection hole 300A impacts the first fixed portion 25A, and that extends from the impact position P1 toward the peak portion 25Y side of the first fixed portion 25A. The line segment SB is a line segment that passes through the impact position P1 and a substantially center of the first injection hole 300A. The impact position P1 is any point in a region of the first fixed portion 25A that the cooling medium injected through the first injection hole 300A directly impacts. For example, the impact position P1 is the center of gravity in such a region.

The second injection hole 300B is a hole through which the cooling medium is injected. As shown in FIG. 4, the second injection hole 300B opens in the cooling medium flow passage 300 toward a side opposite the first fixed portion 25A side. Specifically, in the stator main body 21, the outer peripheral portion above the horizontal plane M1 is divided by the first vertical plane N1 that passes through the central axis T. The outer peripheral portion is divided into the outer peripheral portion where the first fixed portion 25A is disposed (which will be referred to as a first outer peripheral portion UA), and the outer peripheral portion that is opposite the first outer peripheral portion UA (which will be referred to as a second outer peripheral portion UB). The second injection hole 300B is formed so as to inject the cooling medium toward the second outer peripheral portion UB.

The first injection hole 300A and the second injection hole 300B are disposed at the same position in the axial direction, as shown in FIG. 4. Moreover, the diameter of the first injection hole 300A is the same as that of the second injection hole 300B.

The rotary electric machine unit 1000 according to the present embodiment includes a discharge portion (not shown) for discharging the cooling medium. The cooling medium injected through the first injection hole 300A and the second injection hole 300B in the cooling medium flow passage 300 flows downward along the outer peripheral portion of the stator core 20 and reaches the lower portion of the stator core 20. The cooling medium is then discharged from the discharge portion to outside the rotary electric machine unit 1000, The cooling medium discharged from the discharge portion is cooled by a radiator (not shown) or the like disposed external to the rotary electric machine unit 1000, and again fed to the cooling medium flow passage 300 by the pump.

As shown in FIG. 5, the cooling medium flow passage 300 of the present embodiment includes, in addition to the first injection hole 300A and the second injection hole 300B, a plurality of injection holes 300X through which the cooling medium is injected to cool the coil 30. The cooling medium supplied to the cooling medium flow passage 300 is injected through any one of the first injection hole 300A, the second injection hole 300B, and the injection holes 300X.

According to the rotary electric machine unit 1000 of the present embodiment, as shown in FIG. 3, the first fixed portion 25A is disposed in the stator core 20 at a position above the horizontal plane M1 that passes through the central axis T of the stator main body 21, and the peak portion 25Y is disposed at a position displaced from the first vertical plane N1 as viewed in the axial direction. With this configuration, it is possible to reduce a height of the stator core 20 in the vertical direction, and make the rotary electric machine unit 1000 (especially the stator cooling device 90) more compact.

According to the rotary electric machine unit 1000 of the present embodiment, as shown in FIG. 4, the first injection hole 300A of the cooling medium flow passage 300 opens toward the first fixed portion 25A. With this configuration, the cooling medium injected through the first injection hole 300A can directly impact and pass over the first fixed portion 25A, and flow downward toward the outer peripheral portion that is lower than the first fixed portion 25A in the stator core 20 (the outer peripheral portion that is lower than the first fixed portion 25A and on the right side of the first vertical plane N1 in the stator core 20 in FIG. 3). This makes it possible to cool the outer peripheral portion that is lower than the first fixed portion 25A. Consequently, uneven cooling of the stator core 20 (stator main body 21) can be suppressed.

According to the rotary electric machine unit 1000 of the present embodiment, as shown in FIG. 4, the cooling medium flow passage 300 (first injection hole 300A) is disposed above the outer peripheral portion of the stator main body 21 and on the first vertical plane N1 side with respect to the second vertical plane N2 that passes through the peak portion 25Y of the first fixed portion 25A. With this configuration, the cooling medium can be injected through the first injection hole 300A such that the cooling medium directly impacts the first fixed portion 25A and passes over the first fixed portion 25A.

According to the rotary electric machine unit 1000 of the present embodiment, as shown in FIG. 4, the cooling medium is injected through the first injection hole 300A such that the angle θ, which is an inferior angle, is obtusely formed between the line segment SA and the line segment SB, with the line segment SA being a line segment that is on the tangent line passing through the impact position P1 at which the cooling medium impacts the first fixed portion 25A, and that extends from the impact position P1 toward the peak portion 25Y side of the first fixed portion 25A, and the line segment SB passing through the impact position P1 and the substantially center of the first injection hole 300A. With this configuration, the cooling medium injected through the first injection hole 300A can easily pass over the first fixed portion 25A and flow downward toward the outer peripheral portion that is lower than the first fixed portion 25A in the stator core 20 (the outer peripheral portion that is lower than the first fixed portion 25A and on the right side of the first vertical plane N1 in the stator core 20 in FIG. 3), thereby promoting the cooling of the outer peripheral portion that is lower than the first fixed portion 25A.

According to the rotary electric machine unit 1000 of the present embodiment, as shown in FIG. 4, at least part of the first injection hole 300A is disposed inward of the circle E that is formed about the central axis T and passes through the peak portion 25Y of the first fixed portion 25A as viewed in the axial direction. With this configuration, the cooling medium flow passage 300 and the stator core 20 are disposed close to each other, and this makes it possible to achieve a more compact rotary electric machine unit 1000 (especially the stator cooling device 90).

According to the rotary electric machine unit 1000 of the present embodiment, as shown in FIG. 4, the second injection hole 300B is provided so as to inject the cooling medium toward the second outer peripheral portion UB that is on the side opposite the first outer peripheral portion UA where the first fixed portion 25A is disposed, among the outer peripheral portion of the stator main body 21 above the horizontal plane M1 that passes through the central axis T, which is divided by the first vertical plane N1 that passes through the central axis T. With this configuration, the cooling medium can be injected to the second outer peripheral portion UB in addition to the first outer peripheral portion UA, whereby it is possible to also cool the second outer peripheral portion UB. Moreover, the cooling medium injected toward the second outer peripheral portion UB flows downward toward and can cool the outer peripheral portion that is lower than the second outer peripheral portion UB in the stator core 20 (the outer peripheral portion that is lower than the horizontal plane M1 and on the left side of the first vertical plane N1 in the stator core 20 in FIG. 3). Consequently, in the stator core 20, it is possible to cool the outer peripheral portion that includes the second outer peripheral portion UB among the outer peripheral portion divided by the first vertical plane N1 (the outer peripheral portion on the left side of the first vertical plane N1 in the stator core 20 in FIG. 3), whereby uneven cooling of the stator core 20 (stator main body 21) can be suppressed.

According to the rotary electric machine unit 1000 of the present embodiment, as shown in FIG. 4, the first injection hole 300A and the second injection hole 300B are disposed at the same position in the axial direction. With this configuration, in the stator core 20, the cooling medium is injected toward each of the first outer peripheral portion UA and the second outer peripheral portion UB from the same position in the axial direction. Accordingly, uneven cooling in the axial direction between the first outer peripheral portion UA side and the second outer peripheral portion UB side can be suppressed. Specifically, it is possible to suppress uneven cooling between positions on the first outer peripheral portion UA side and the second outer peripheral portion UB side that are symmetrical in the axial direction with respect to the first vertical plane N1.

According to the rotary electric machine unit 1000 of the present embodiment, as shown in FIG. 3, the second fixed portion 25B and the third fixed portion 25C of the stator core 20 are disposed at positions that are lower than the horizontal plane M1. With this configuration, the cooling medium injected through the first injection hole 300A and the second injection hole 300B in the cooling medium flow passage 300 can pass over the second fixed portion 25B and the third fixed portion 25C by the force of gravity when the cooling medium reaches the second fixed portion 25B and the third fixed portion 25C. Consequently, it is possible to suppress the second fixed portion 25B and the third fixed portion 25C from interfering with the downward flow of the cooling medium, and thus possible to suppress uneven cooling of the stator core 20 (stator main body 21).

According to the rotary electric machine unit 1000 of the present embodiment, as shown in FIG. 3, the three fixed portions in the fixed portion group 25 are disposed on the outer peripheral portion of the stator core 20 such that there is an equal interval between two adjacent fixed portions as viewed in the axial direction. With this configuration, the stator core 20 can be firmly fixed to the case body portion 200B, and it is possible to prevent the stator core 20 from rotating.

B. Second Embodiment

B1. Configuration of First Injection Hole 300A

Figure 6:
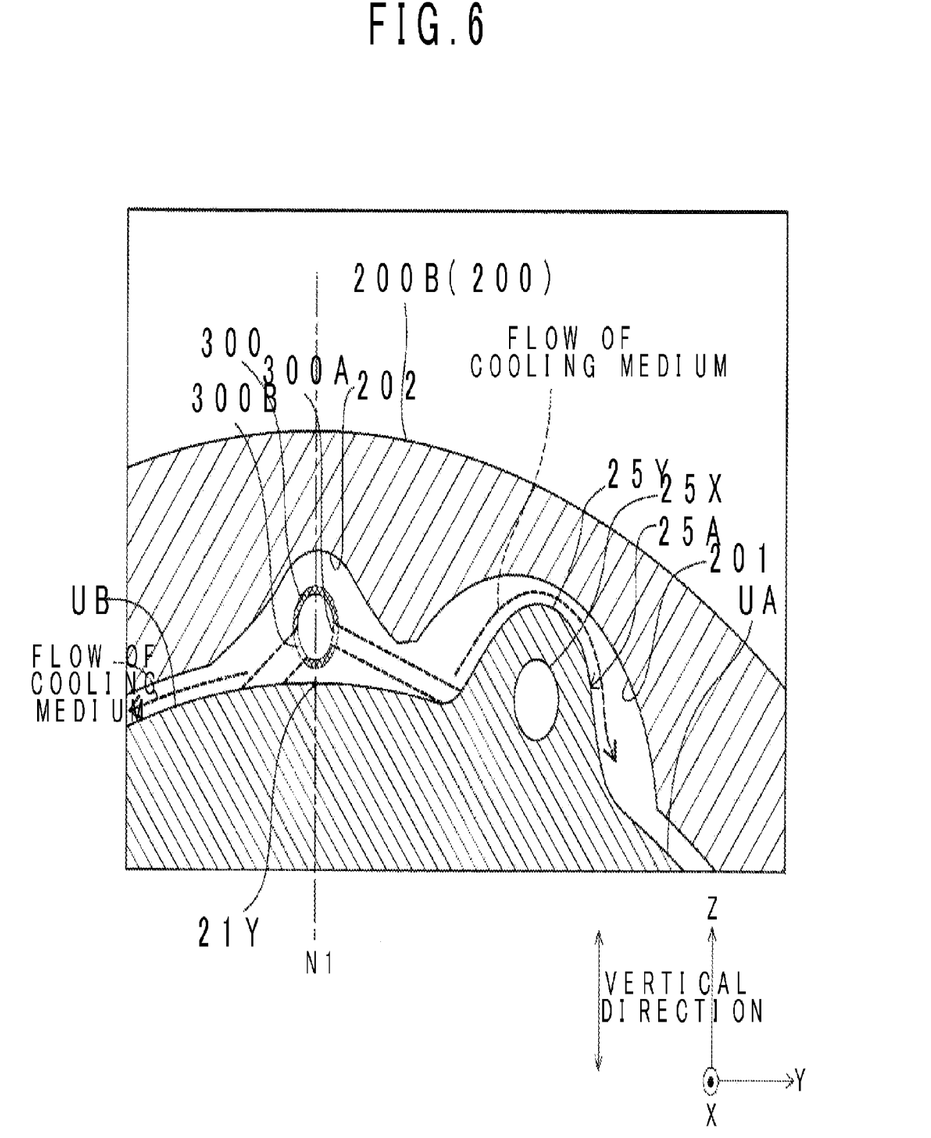
FIG. 6 is a view showing a first injection hole 300A and a second injection hole 300B in a cooling medium flow passage 300 as a second embodiment.

FIG. 6 is a view showing the first injection hole 300A and the second injection hole 300B in the cooling medium flow passage 300 serving as a second embodiment. In the first embodiment, above, the first injection hole 300A and the second injection hole 300B are configured to have the same diameter. However, in the second embodiment, as shown in FIG. 6, the first injection hole 300A is configured to have a smaller diameter than the second injection hole 300B.

According to the cooling medium flow passage 300 of the present embodiment, as shown in FIG. 6, the first injection hole 300A has a smaller diameter than the second injection hole 300B. With this configuration, the cooling medium can be more strongly injected through the first injection hole 300A, compared to the second injection hole 300B. Accordingly, the cooling medium injected through the first injection hole 300A can easily pass over the first fixed portion 25A, and therefore, a large amount of the cooling medium can flow downward toward the outer peripheral portion that is lower than the first fixed portion 25A (the outer peripheral portion on the right side of the first vertical plane N1 in the stator core 20 in FIG. 3). Consequently, it is possible to suppress uneven cooling of the outer peripheral portion that is lower than the first fixed portion 25A.

C. Modification Examples

It should be noted that structural elements described in the embodiments above other than the structural elements claimed in the independent claim are additional, and may be omitted as appropriate. Further, the present invention is not limited to the examples and embodiments above, and may be embodied in various modes without departing from the scope of the present invention. For example, the following modifications are possible.

C1. First Modification Example

In the embodiments above, the cooling medium is injected through the first injection hole 300A such that the angle θ, which is an inferior angle, is obtusely formed between the line segment SA and the line segment SB, with the line segment SA being a line segment that is on a tangent line passing through the impact position P1 at which the cooling medium impacts the first fixed portion 25A, and that extends from the impact position P1 toward the peak portion 25Y side of the first fixed portion 25A, and the line segment SB passing through the impact position P1 and the substantially center of the first injection hole 300A. However, the present invention is not limited to this example. The following configuration may be employed, for example.

Figure 7:
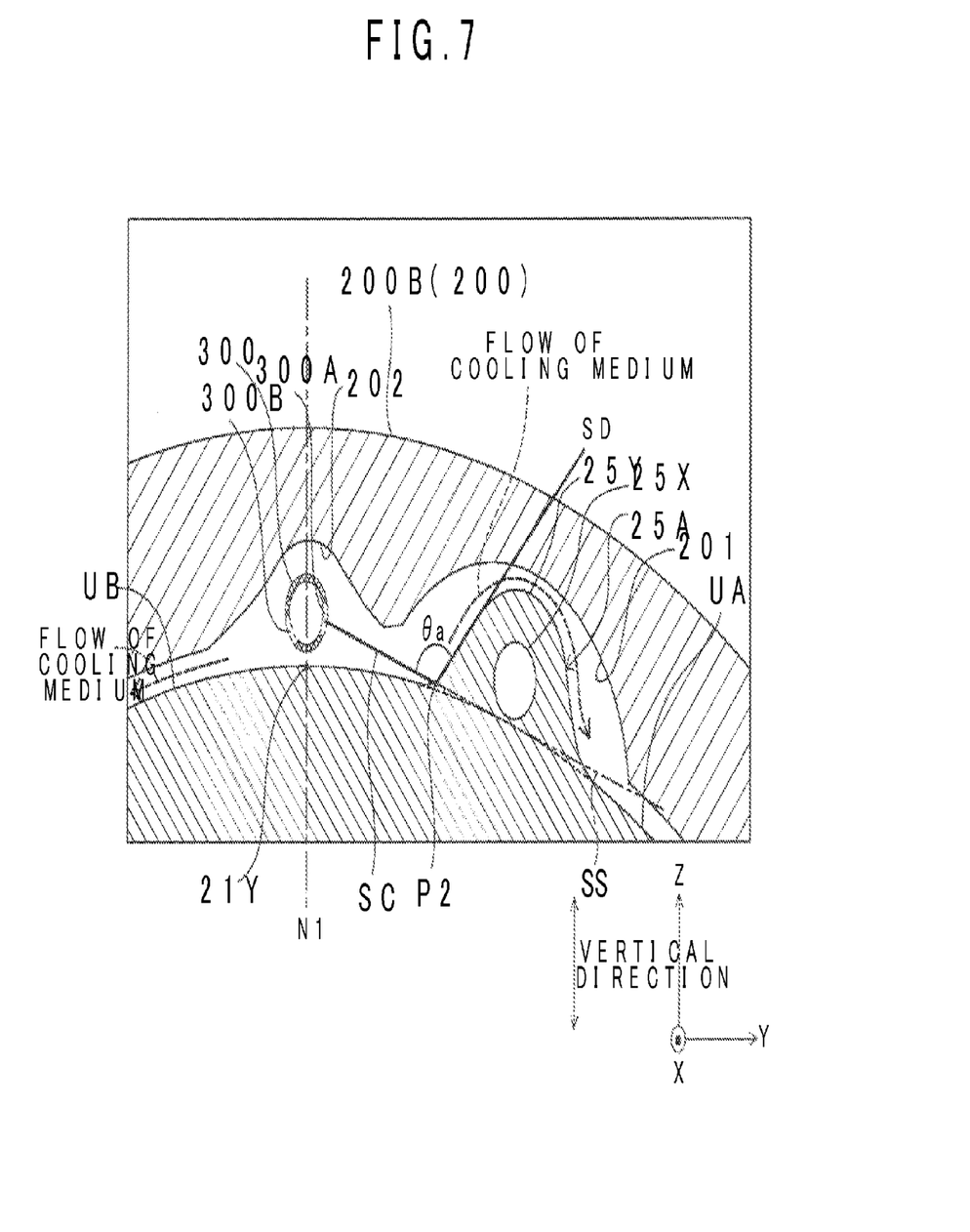
FIG. 7 is a view illustrating a first modification example.

FIG. 7 is a view illustrating a first modification example. Specifically, FIG. 7 is an enlarged view around the cooling medium flow passage 300 and the first fixed portion 25A. The first injection hole 300A may be disposed in the cooling medium flow passage 300 such that an angle θa, which is an inferior angle, is obtusely formed between a line segment SC and a line segment SD in FIG. 7. In this case, a tangent line SS is a tangent line in the region where the first fixed portion 25A is disposed in the stator main body 21 and passes through the substantially center of the first injection hole 300A, and an intersection point P2 is set as a point at which the tangent line SS intersects with a surface of the first fixed portion 25A on the first vertical plane N1 side. The line segment SC is a line segment that is on the tangent line SS and that passes through the intersection point P2 and the substantially center of the first injection hole 300A. The line segment SD is a line segment that is on a tangent line at the intersection point P2 of the first fixed portion 25A and that extends from the intersection point P2 toward the peak portion 25Y side of the first fixed portion 25A. With this configuration, the cooling medium injected through the first injection hole 300A can easily pass over the first fixed portion 25A and flow downward toward the outer peripheral portion that is lower than the first fixed portion 25A (the outer peripheral portion on the right side of the first vertical plane N1 in the stator core 20 in FIG. 3), thereby promoting the cooling of the outer peripheral portion that is lower than the first fixed portion 25A.

C2. Second Modification Example

In the embodiments and the modification example above, the cooling medium flow passage 300 is disposed on the first vertical plane N1, above the uppermost portion 21Y that is the highest region of the stator main body 21, and inward of the circle E that is formed about the central axis T and passes through the peak portion 25Y of the first fixed portion 25A as viewed in the axial direction. However, the present invention is not limited to this.

Figure 8:
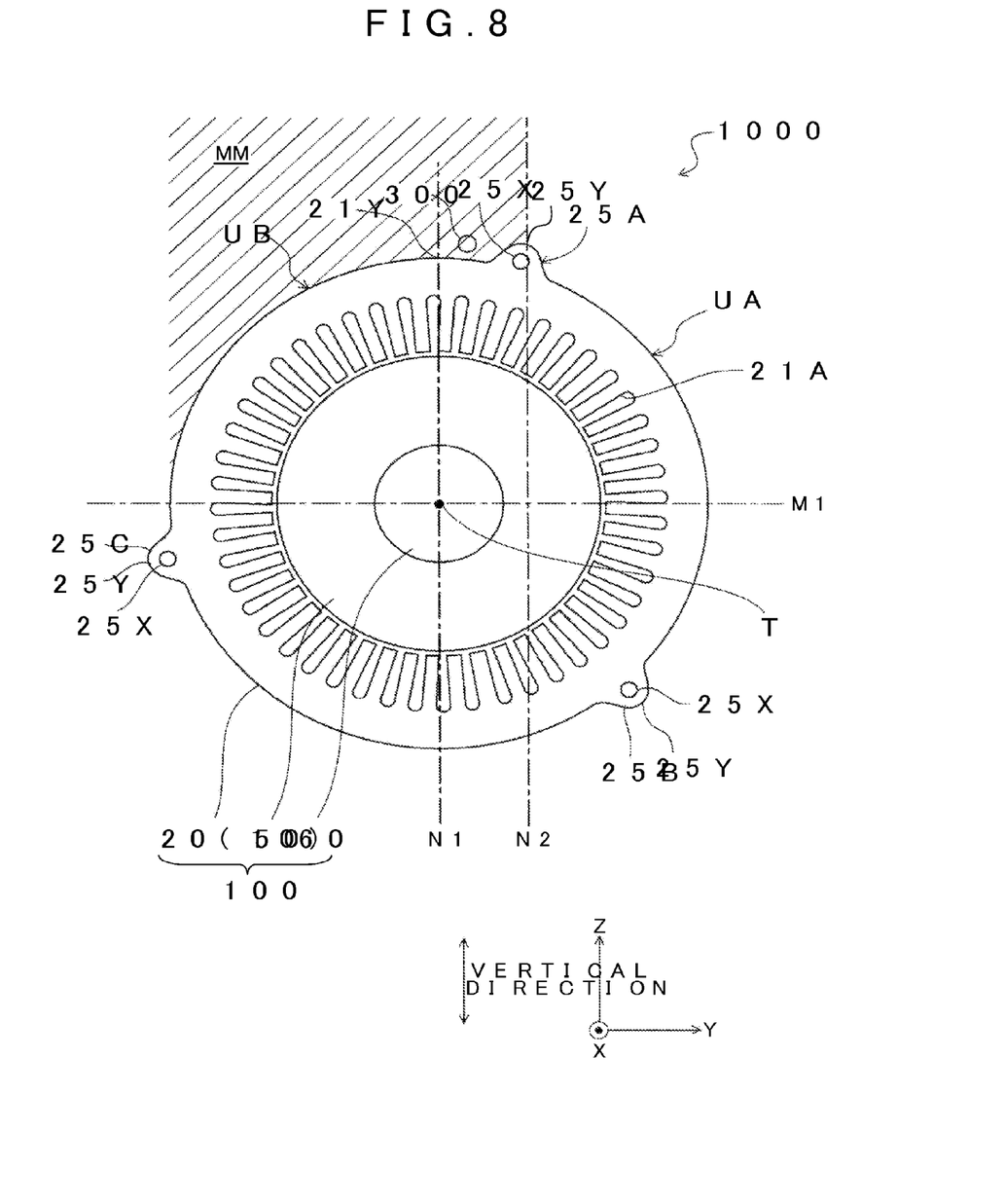
FIG. 8 is a view illustrating a second modification example.

FIG. 8 is a view illustrating a second modification example. Specifically, FIG. 8 is a view illustrating a positional relationship between the stator core 20 (first fixed portion 25A) and the cooling medium flow passage 300. The present invention may employ the configuration in which, as shown in FIG. 8, the cooling medium flow passage 300 is disposed at any position in the region above the outer peripheral portion of the stator main body 21 on the first vertical plane N1 side with respect to the second vertical plane N2 that passes through the peak portion 25Y of the first fixed portion 25A (a hatched region in FIG. 8; hereinafter also referred to as a region MM). For example, as shown in FIG. 8, the present invention may employ a configuration in which the cooling medium flow passage 300 is provided at a position in the region MM that is displaced toward the first fixed portion 25A with respect to the first vertical plane N1, instead of being disposed on the first vertical plane N1.

C3. Third Modification Example

In the embodiments and modification examples above, the cooling medium flow passage 300 is disposed in the recessed portion 202 formed in the case body portion 200B. However, the present invention is not limited to this. For example, a passage formed by hollowing out the inside of the case body portion 200B may be used as the cooling medium flow passage 300. In this case, the first injection hole 300A and the second injection hole 300B are formed by through holes that penetrate through the case body portion 200B. With this configuration, it is no longer necessary to provide the cooling medium flow passage 300 as a separate component of the case body portion 200B, and therefore the number of components can be reduced.

C4. Fourth Modification Example

In the embodiments and modification examples above, the cooling medium flow passage 300 is disposed inward of the circle E as viewed in the axial direction. However, the present invention is not limited to this example. For example, the present invention may employ a configuration in which at least part of the cooling medium flow passage 300 (for example, at least part of the first injection hole 300A) is disposed inward of the circle E. With this configuration, the rotary electric machine unit 1000 (especially the stator cooling device 90) can be made more compact.

C5. Fifth Modification Example

In the embodiments and modification examples above, the first injection hole 300A and the second injection hole 300B are disposed at the same position in the axial direction. For example, the present invention is not limited to this example. However, in the cooling medium flow passage 300, the first injection hole 300A may be disposed at a position closer to the side where the pump that feeds the cooling medium (see FIG. 5) is disposed, with respect to the second injection hole 300B. With this configuration, the cooling medium can be more strongly injected through the first injection hole 300A compared to the second injection hole 300B. Accordingly, the cooling medium injected through the first injection hole 300A can easily pass over the first fixed portion 25A, and a large amount of the cooling medium can flow downward toward the outer peripheral portion that is lower than the first fixed portion 25A (the outer peripheral portion on the right side of the first vertical plane N1 in the stator core 20 in FIG. 3). Consequently, it is possible to suppress uneven cooling of the outer peripheral portion that is lower than the first fixed portion 25A.

C6. Sixth Modification Example

In the embodiments and modification examples above, the rotary electric machine 100 can function as both a motor and a generator. However, the present invention is not limited to this. For example, the rotary electric machine 100 may only function as a generator without functioning as a motor. Alternatively, the rotary electric machine 100 may only function as a motor without functioning as a generator.

The present invention is well suited for use in cooling a stator of a rotary electric machine.

What is claimed is:

1. A stator cooling device, comprising:
   a cylindrical stator main body that uses a rotation axis of a rotary electric machine as a central axis;
   a fixed portion that is formed on an outer peripheral portion of the stator main body so as to protrude outward in a radial direction of the stator main body, and fixes the stator main body to a case that houses the rotary electric machine; and
   a cooling medium flow passage into which a cooling medium is supplied and that includes an injection hole through which the cooling medium is injected, wherein
   the fixed portion is disposed above a horizontal plane that passes through the central axis, and a peak portion that is farthest in the fixed portion from the central axis as viewed in an axial direction of the central axis is disposed at a position displaced from a first vertical plane that is a vertical plane that passes through the central axis, and
   the injection hole opens toward the fixed portion above the outer peripheral portion of the stator main body and toward the first vertical plane side with respect to a second vertical plane that is a vertical plane that passes through the peak portion.

2. The stator cooling device according to claim 1, wherein the cooling medium is injected through the injection hole such that an angle, which is an inferior angle, is obtusely formed between a line segment, which is a line segment that is on a tangent line passing through an impact position at which the cooling medium injected through the injection hole impacts the fixed portion, and that extends from the impact position toward the peak portion side, and another line segment, which passes through the impact position and the injection hole.

3. The stator cooling device according to claim 2, wherein at least part of the injection hole is disposed inward of a circle that is formed about the central axis and passes through the peak portion as viewed in the axial direction.

4. The stator cooling device according to claim 3, wherein if the injection hole is referred to as a first injection hole, the cooling medium flow passage includes a second injection hole that is different from the first injection hole, and through which the cooling medium is injected toward a second outer peripheral portion, wherein a first outer peripheral portion and the second outer peripheral portion are formed by dividing the outer peripheral portion of the stator main body above the horizontal plane that passes through the central axis by the first vertical plane that passes through the central axis such that the fixed portion is disposed in the first outer peripheral portion, and the second outer peripheral portion is opposite the first outer peripheral portion.

5. The stator cooling device according to claim 4, wherein the first injection hole and the second injection hole are disposed at a same position in the axial direction.

6. The stator cooling device according to claim 5, wherein the first injection hole has a smaller diameter than the second injection hole.

7. The stator cooling device according to claim 1, wherein at least part of the injection hole is disposed inward of a circle that is formed about the central axis and passes through the peak portion as viewed in the axial direction.

8. The stator cooling device according to claim 2, wherein if the injection hole is referred to as a first injection hole, the cooling medium flow passage includes a second injection hole that is different from the first injection hole, and through which the cooling medium is injected toward a second outer peripheral portion, wherein a first outer peripheral portion and the second outer peripheral portion are formed by dividing the outer peripheral portion of the stator main body above the horizontal plane that passes through the central axis by the first vertical plane that passes through the central axis such that the fixed portion is disposed in the first outer peripheral portion, and the second outer peripheral portion is opposite the first outer peripheral portion.

9. The stator cooling device according to claim 7, wherein if the injection hole is referred to as a first injection hole, the cooling medium flow passage includes a second injection hole that is different from the first injection hole, and through which the cooling medium is injected toward a second outer peripheral portion, wherein a first outer peripheral portion and the second outer peripheral portion are formed by dividing the outer peripheral portion of the stator main body above the horizontal plane that passes through the central axis by the first vertical plane that passes through the central axis such that the fixed portion is disposed in the first outer peripheral portion, and the second outer peripheral portion is opposite the first outer peripheral portion.

10. The stator cooling device according to claim 8, wherein the first injection hole and the second injection hole are disposed at a same position in the axial direction.

11. The stator cooling device according to claim 9, wherein the first injection hole and the second injection hole are disposed at a same position in the axial direction.

12. The stator cooling device according to claim 4, wherein the first injection hole has a smaller diameter than the second injection hole.

13. The stator cooling device according to claim 8, wherein the first injection hole has a smaller diameter than the second injection hole.

14. The stator cooling device according to claim 9, wherein the first injection hole has a smaller diameter than the second injection hole.

15. The stator cooling device according to claim 10, wherein the first injection hole has a smaller diameter than the second injection hole.

16. The stator cooling device according to claim 11, wherein the first injection hole has a smaller diameter than the second injection hole.

\* \* \* \* \*